US011884140B2

(12) United States Patent
Takaoka (10) Patent No.: US 11,884,140 B2
(45) Date of Patent: Jan. 30, 2024

(54) OPENING/CLOSING BODY OPENING/CLOSING DEVICE

(71) Applicant: HI-LEX CORPORATION, Hyogo (JP)

(72) Inventor: Hiroyuki Takaoka, Hyogo (JP)

(73) Assignee: HI-LEX CORPORATION, Hyogo (JP)

(*) Notice: Subject to any disclaimer, the term of this patent is extended or adjusted under 35 U.S.C. 154(b) by 85 days.

(21) Appl. No.: 17/442,257

(22) PCT Filed: Mar. 24, 2020

(86) PCT No.: PCT/JP2020/012970
§ 371 (c)(1),
(2) Date: Sep. 23, 2021

(87) PCT Pub. No.: WO2020/196500
PCT Pub. Date: Oct. 1, 2020

(65) Prior Publication Data
US 2022/0153094 A1 May 19, 2022

(30) Foreign Application Priority Data
Mar. 25, 2019 (JP) ................. 2019-056945

(51) Int. Cl.
*E05F 11/54* (2006.01)
*B60J 1/17* (2006.01)
*E05F 11/48* (2006.01)

(52) U.S. Cl.
CPC ............... *B60J 1/17* (2013.01); *E05F 11/481* (2013.01); *E05Y 2600/626* (2013.01)

(58) Field of Classification Search
CPC .......... B60J 1/17; E05F 11/481; E05F 11/486; E05F 11/385; E05Y 2600/626;
(Continued)

(56) References Cited

U.S. PATENT DOCUMENTS 868,413 A * 10/1907 Cramer .................. E06B 7/14
49/408
1,954,268 A * 4/1934 Simpson ............... B60J 10/75
49/377
(Continued)

FOREIGN PATENT DOCUMENTS

JP S60-115373 U 8/1985
WO 2015064266 A1 5/2015

OTHER PUBLICATIONS

International Search Report from International Application No. PCT/JP2020/012970, dated Jun. 16, 2020.
(Continued)

*Primary Examiner* — Jerry E Redman
(74) *Attorney, Agent, or Firm* — Shih IP Law Group, PLLC.

(57) ABSTRACT

Provided is an opening/closing body opening/closing device capable of effectively preventing water such as rainwater flowing down from an opening/closing body carried by a carrier plate from adhering to a guide rail. The opening/closing body opening/closing device includes a carrier plate that carries an opening/closing body, and a guide rail that guides movement of the carrier plate in a lifting and lowering direction of the opening/closing body. The carrier plate includes, at an upper end portion, a water holding section that holds water reaching the upper end portion of the carrier plate from above. The water holding section includes a water receiving section that faces upward and receives the reaching water, and an outflow preventing section provided with a preventing surface that faces the water receiving section side and prevents the water from flowing out to the guide rail.

3 Claims, 6 Drawing Sheets

(58) Field of Classification Search
CPC ........... E05Y 2201/64; E05Y 2201/684; E05Y 2800/266; E05Y 2800/428; E05Y 2900/55
USPC .......................................... 49/348, 349, 352
See application file for complete search history.

(56) References Cited

U.S. PATENT DOCUMENTS

| | | | | |
|---|---|---|---|---|
| 4,962,601 | A * | 10/1990 | Gold | B60J 10/25 49/377 |
| 5,505,022 | A * | 4/1996 | Shibata | E05F 15/689 49/352 |
| 5,791,088 | A * | 8/1998 | Martinelli | B60J 10/75 49/378 |
| 5,799,441 | A * | 9/1998 | Shibata | E05F 11/481 49/352 |
| 7,861,464 | B2 * | 1/2011 | Bisnack | B60J 1/008 49/502 |
| 8,225,551 | B2 * | 7/2012 | Castellon | B60J 1/17 49/226 |
| 9,650,825 | B2 * | 5/2017 | Tanaka | E05F 11/382 |
| 9,855,829 | B2 * | 1/2018 | Yamada | B60J 1/08 |
| 10,155,436 | B2 * | 12/2018 | Krishnan | B60R 13/07 |
| 11,260,735 | B2 * | 3/2022 | Yamada | B60J 10/75 |
| 2007/0130835 | A1 * | 6/2007 | Isomura | E05F 11/481 49/352 |
| 2007/0294951 | A1 * | 12/2007 | Tenorio | E05F 11/382 49/375 |

OTHER PUBLICATIONS

Notice of Reasons for Refusal of JP2019-056945, dated Jul. 16, 2021.

* cited by examiner

OPENING/CLOSING BODY OPENING/CLOSING DEVICE

TECHNICAL FIELD

The present invention relates to an opening/closing body opening/closing device that lifts and lowers an opening/closing body via a carrier plate.

BACKGROUND ART

A window regulator installed on a vehicle is known as an example of an opening/closing body opening/closing device that opens and closes an opening by lifting and lowering an opening/closing body. The opening/closing body is lifted and lowered by moving a carrier plate that carries the opening/closing body.

The window regulator moves a window glass carried by the carrier plate by transmitting driving force of a drive source to the carrier plate via a wire. For example, the window regulator disclosed in Patent Literature (hereinafter, referred to as "PTL") 1 includes the carrier plate that carries the window glass, a guide rail that guides movement of the carrier plate, a drive section, a drum that rotates by driving force of the drive section, and a wire that is connected to the drum at one end and connected to the carrier plate at the other end.

Generally for the window regulator, water (or moisture) such as rainwater enters inside a door though the window glass of a vehicle, and possibly adheres to the guide rail or the wire via the carrier plate.

The water adhered to the guide rail or the wire may flow down along the guide rail or the wire, and reach the drive section or the drum. This may cause rust on those components.

In this regard, the window regulator in PTL 1 includes eaves extending in the width direction of the carrier plate at the upper end portion of the carrier plate. The window regulator in PTL 1 further includes a guide portion over the horizontal direction of the positions where the guide rail and an inner cable exist in the vertically downward direction. The guide portion discharges water flowed from a portion where the eaves and the window glass are attached, without adhering to both the guide rail and the inner cable.

CITATION LIST

Patent Literature

PTL 1
WO 2015/064266

SUMMARY OF INVENTION

Technical Problem

For a conventional window regulator, however, water (or moisture) such as rainwater that has entered inside a door when a window is open possibly moves to the guide rail side from an upper surface of eaves due to vibration when a carrier plate slides on a guide rail. With a curved guide rail, in particular, the eaves incline so that the guide rail side is a lower side when the carrier plate is positioned around an upper end portion of the guide rail, and this causes the water such as rainwater prevented from dropping down by the eaves to move to the guide rail. In this case, the guide rail possibly gets wet by the water such as rainwater moved from the eaves.

An object of the present invention is to provide an opening/closing body opening/closing device that prevents water such as rainwater adhered to a carrier plate though an opening/closing body carried by the carrier plate from adhering to a guide rail.

Solution to Problem

An opening/closing body opening/closing device according to the present invention includes: a carrier plate that carries an opening/closing body; and a guide rail that guides movement of the carrier plate in a lifting and lowering direction of the opening/closing body, wherein the carrier plate includes, at an upper end portion of the carrier plate, a water holding section that holds water reaching the upper end portion from above, and the water holding section includes: a water receiving section that faces upward and receives the reaching water, and an outflow preventing section provided with a preventing surface that faces a side of the water receiving section and prevents the water from flowing out to the guide rail.

Advantageous Effects of Invention

According to the present invention, it is possible to effectively prevent water (or moisture) such as rainwater adhered to a carrier plate though an opening/closing body carried by the carrier plate from adhering to a guide rail.

DESCRIPTION OF EMBODIMENT

Hereinafter, an embodiment of the present invention will be described in detail with reference to the accompanying drawings.

<Overall Configuration of Opening/Closing Body Opening/Closing Device>

An opening/closing body opening/closing device in the present embodiment is a device mounted on a mounting object including an opening, and lifts and lowers an opening/closing body carried by a carrier plate by moving the carrier plate. The opening opens and closes by the movement of the carrier plate. In the present embodiment, the opening/closing body opening/closing device is described as a so-called window regulator that is fixed between an inner panel and an outer panel of a door of a vehicle, which is an example of the mounting object, and that lifts and lowers a window glass, which is an example of the opening/closing body. Note that the opening/closing body opening/closing device is not limited to the window regulator, and the present embodiment is applicable to another device as long as the device guides movement of a carrier plate and lifts and lowers an opening/closing body carried by carrier plate 20.

Figure 1:
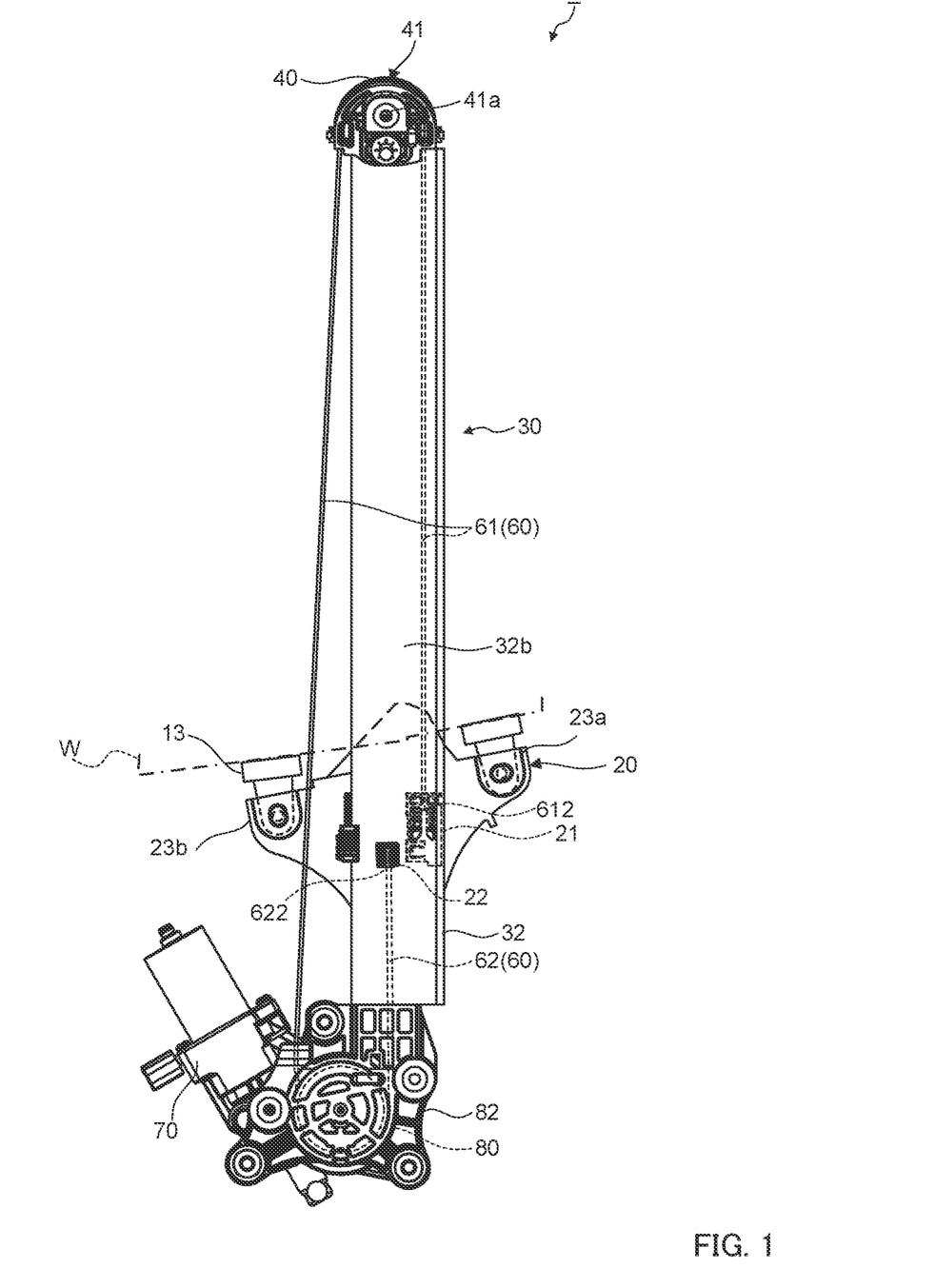
FIG. 1 is an overall view of an opening/closing body opening/closing device according to an embodiment of the present invention.

FIG. 1 is an overall view of the opening/closing body opening/closing device viewed from the back side. Opening/closing body opening/closing device 1 illustrated in FIG. 1 lifts and lowers the window glass being opening/closing body W carried by carrier plate 20 via glass holders 13. Opening/closing body opening/closing device 1 is capable of moving opening/closing body W and this movement switches between a closed state and an open state of the window, which is the opening.

Opening/closing body opening/closing device 1 is mounted in a door panel of the vehicle by using a bracket (not illustrated) of guide rail 30 and a fixing section (not illustrated) of a housing, for example. Note that, in the present embodiment, a vertical direction is a longitudinal direction of guide rail 30 of the window regulator, and a lateral direction is a direction parallel to a glass surface of the window glass, which is opening/closing body W supported by the window regulator, and perpendicular to the vertical direction, unless otherwise noted.

Opening/closing body opening/closing device 1 includes carrier plate 20 provided with glass holders 13 for connecting the window glass being opening/closing body W, guide rail 30, direction-changing section 40 included in upper joint member 41, cables 60, drive section 70, drum member 80, and drum housing 82.

<Upper Joint Member 41 (Direction-Changing Section 40)>

Upper joint member 41 is formed of resin, for example, and is connected to an upper end of guide rail 30. Upper joint member 41 is provided with fastening section 41a that is fastened to the door of the vehicle by a fastening member such as a bolt (not illustrated). Fastening section 41a is provided with an insertion hole, for example, through which the fastening member is inserted. Fastening section 41a is fastened to, for example, the inner panel or the outer panel of the door of the vehicle, and upper joint member 41 is fixed to the door of the vehicle accordingly. Upper joint member 41 includes direction-changing section 40 where lifting cable 61 is wound, and direction-changing section 40 changes a moving direction of lifting cable 61.

Direction-changing section 40 is a guide groove provided in a circular arc shape, and lifting cable 61 changes the moving direction by sliding on direction-changing section 40. Direction-changing section 40 converts movement of pulling down one end side of lifting cable 61 into movement of pulling up the other end side of lifting cable 61. A pulley rotatably provided on a main body section of upper joint member 41 may be adopted as direction-changing section 40.

<Drum Member 80>

Drum member 80 is connected to drive section 70, and cables 60 are wound around drum member 80. Terminal members of cables 60 are fixed to drum member 80, and drum member 80 winds and unwinds cables 60. In the present embodiment, drum member 80 includes a locking section (not illustrated) that houses the terminal members of the end portions of cables 60, and is rotatably housed in a housing. Drum member 80 rotates in a forward direction and a backward direction by rotation drive of drive section 70. Drum member 80 is connected to carrier plate 20 via cables 60. Drum member 80 is formed of, for example, resin or the like.

In the present embodiment, drum member 80 is connected to cable ends of lifting cable 61 and lowering cable 62, which compose cables 60, and houses each cable. Drum member 80 winds and unwinds lifting cable 61 and lowering cable 62 by rotating in the forward direction and the backward direction. Lifting cable 61 and lowering cable 62 are wound around drum member 80 in the present embodiment in opposite directions to each other. Drum member 80 pulls lifting cable 61 by winding lifting cable 61 or pulls lowering cable 62 by winding lowering cable 62, depending on the rotation direction. Drum member 80 of the present embodiment is connected to both lifting cable 61 and lowering cable 62 at a lower end portion of guide rail 30, and thus its rotation by drive section 70 moves carrier plate 20 via cables 60.

<Drum Housing 82>

Drum housing 82 is formed of resin, for example, and rotatably houses drum member 80. Drive section 70 is fixed to drum housing 82, and the lower end portion of guide rail 30 is also connected to drum housing 82. Drum housing 82 includes a fastening section that is fastened to the door of the vehicle.

<Drive Section 70>

Drive section 70 is connected to drum member 80, and supplies drum member 80 with driving force to rotate drum member 80. Drive section 70 is connected to a drive source such as a power supply for driving drum member 80 so that drum member 80 is rotated by drive of the drive source. Drive section 70 rotates drum member 80 by the energy of the drive source, for example, and winds and unwinds cables 60.

Drive section 70 includes, for example, a motor driven by turning the power on and off, and rotates connected drum member 80. Drive section 70 is housed in a motor housing, and fixed to a base body as a mounting object such as the door via the motor housing. In the present embodiment, the motor housing is fixed to drum housing 82. In the present embodiment, drive section 70 is placed at a lower end portion of the door panel inside the door panel.

Drive section 70 of the present embodiment is a motor that is electrically driven by a current supplied from a battery. The motor of drive section 70 preferably includes a function of locking an output shaft at a predetermined rotational angle, which is a so-called clutch function.

Drive section 70 fits a motor shaft into a center portion of drum member 80, and rotates drum member 80 by rotation of the motor shaft. Note that, for the motor and drum member 80, the rotational motion of the motor is transmitted to drum member 80 via a power transmission section such as a worm gear, for example. The motor as drive section 70 rotates in a forward direction and a backward direction, and thus, drum member 80 rotates in the forward direction and the backward direction.

Note that the present embodiment employs a configuration of placing drive section 70 and drum member 80 on the lower end side of guide rail 30, but the configuration is not limited to this. Drive section 70 and drum member 80 may be placed at any positions and cables 60 may be arranged in any way, as long as drive section 70 and drum member 80 can lift and lower carrier plate 20 via cables 60. For example, drum member 80 rotated by drive section 70 may be provided at a height position between an upper end position and a lower end position. In this case, carrier plate 20 may be lifted and lowered via cables 60 wound and unwound by drum member 80 at the position.

<Cables 60>

End portions of cables 60 are connected to carrier plate 20. Cables 60 are wound and unwound by the rotation of drum member 80. Cables 60 operate and move carrier plate 20. Cables 60 are locked to drum member 80 and carrier plate 20 with the respective terminal members at both ends. For the locking configuration, cables 60 may be engaged in any way unless the terminal members at both ends respectively disengage from drum member 80 and carrier plate 20 during the rotation of drum member 80.

In the present embodiment, cables 60 include lifting cable 61 and lowering cable 62.

Lifting cable 61 has one end connected to drum member 80, a middle portion wound on direction-changing section 40 of upper joint member 41, and the other end connected to carrier plate 20. Lifting cable 61 is pulled by the rotation of drum member 80 in a direction of winding lifting cable 61, thereby pulling up carrier plate 20 via direction-changing section 40.

Lowering cable 62 has one end connected to drum member 80, and the other end connected to carrier plate 20. Lowering cable 62 is pulled by the rotation of drum member 80 in a direction of winding lowering cable 62, thereby pulling down carrier plate 20.

<Guide Rail 30>

Guide rail 30 guides movement of carrier plate 20 in a lifting and lowering direction of opening/closing body W. Guide rail 30 is a rail extending in a moving direction of carrier plate 20, and supports carrier plate 20 such that carrier plate 20 is movable along a lifting and lowering path. In the present embodiment, guide rail 30 is provided to the door of the vehicle, corresponding to a lifting and lowering track of opening/closing body W, and is provided inclining to a rear side of the vehicle with respect to the vertical direction of the vehicle, for example.

Guide rail 30 is typically formed of a metal plate, and the metal plate is in a folded shape extending along the longitudinal direction.

To be more specific, guide rail 30 includes recessed guide section body 32 with a U-shape cross section (see FIG. 2), and guide section 32c that is provided on both side portions in a width direction of guide section body 32 and slidably engaged with carrier plate 20.

Figure 2:
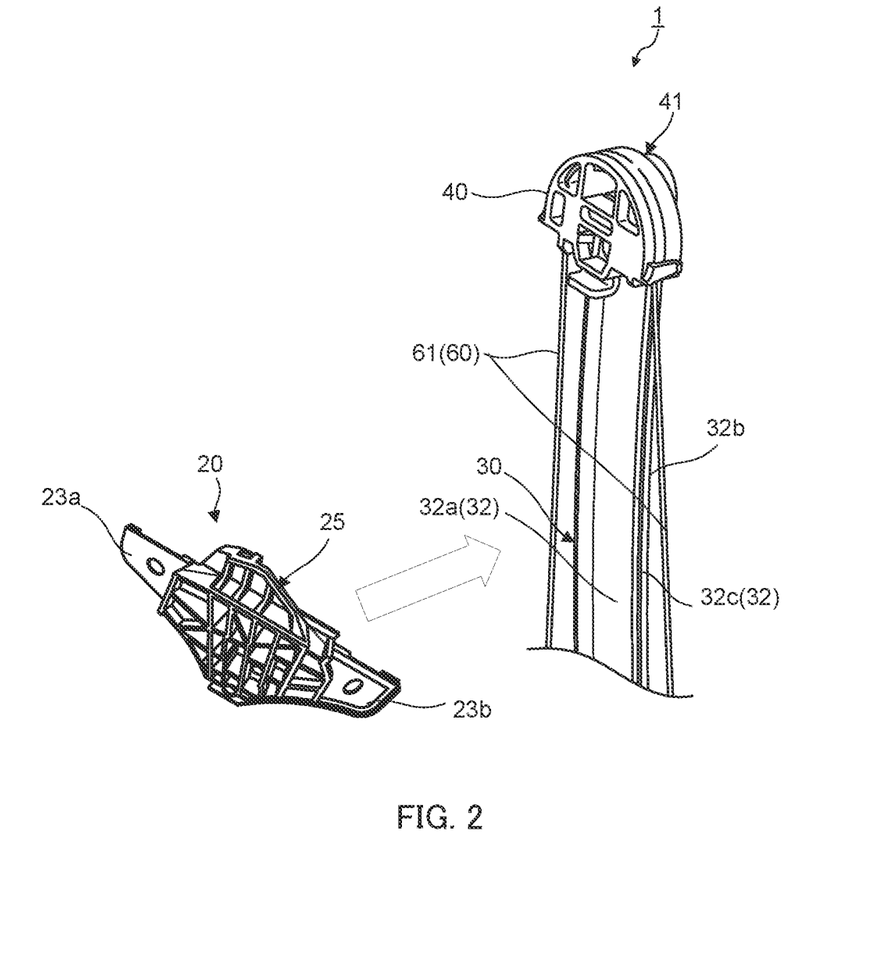
FIG. 2 is an exploded perspective view of a part of the opening/closing body opening/closing device according to the embodiment of the present invention.

When guide rail 30 is viewed laterally, guide section body 32 is formed in a curved shape in which a side of one surface (referred to as "front surface 32a" for convenience) is convex and a side of the other surface (referred to as "back surface 32b" for convenience) is concave, as illustrated in FIG. 2. Carrier plate 20 is slidably attached to guide section body 32 engaging with guide section 32c on the front surface 32a side, i.e., the convex surface side, of guide rail 30.

<Opening/Closing Body W>

Opening/closing body W is connected to carrier plate 20, and is lifted and lowered by the movement of carrier plate 20 to open and close a predetermined opening (e.g., an opening provided on a door body). Opening/closing body W switches between a closed state and an open state of the opening.

In the present embodiment, opening/closing body W is a window glass. Note that the window glass may slide along a door sash that defines the opening (not illustrated), and may be supported by the door sash.

Opening/closing body W closes the opening by carrier plate 20 being guided to a position on the upper end side of guide rail 30, and opens the opening as carrier plate 20 is guided to a position on the lower end side from the position on the upper end side of guide rail 30.

Opening/closing body W in the present embodiment is moved by carrier plate 20 that is moved by winding and unwinding of cables 60. Although the present embodiment adopts the window glass as opening/closing body W, opening/closing body W may be, for example, a panel formed of metal, resin, or the like other than glass.

<Carrier Plate 20>

Carrier plate 20 illustrated in FIGS. 1 and 2 is connected to opening/closing body W, and its movement is guided by guide rail 30. Carrier plate 20 is connected via glass holders 13 attached to upper end portion 20b. Carrier plate 20 is lifted and lowered while carrying opening/closing body W. Carrier plate 20 moves between an upper position where the window is in a closed state completely shielded with opening/closing body W, and a lower position where the window is in a fully open state. Carrier plate 20 moves into the door (not illustrated) with opening/closing body W when moving down so that the window is in the open state from the closed state.

Carrier plate 20 is moved on front surface 32a of curved guide rail 30 by the drive of drive section 70, and changes the posture in accordance with the curvature of guide rail 30. Carrier plate 20 is moved on front surface 32a of guide rail 30 while connecting to the lower side of opening/closing body W.

Carrier plate 20 includes end housing sections 21 and 22 that house end portions of cables 60.

In the present embodiment, carrier plate 20 includes plate-shaped plate body 20a with a predetermined thickness, and provided with end housing sections 21 and 22 on the back side, i.e., the side of a surface facing front surface 32a of guide rail 30, of plate body 20a.

The end portions of lifting cable 61 and lowering cable 62 are composed of respective cable ends and terminal members formed of metal. End housing sections 21 and 22 include end housing section 21 housing terminal member 612 of lifting cable 61 that lifts carrier plate 20, and end housing section 22 housing terminal member 622 of lowering cable 62 that lowers carrier plate 20.

Lifting cable 61 and lowering cable 62 are respectively led out from end housing sections 21 and 22 of carrier plate 20 such that a led-out portion of each of lifting cable 61 and lowering cable 62 serves as a supporting point for lifting or lowering carrier plate 20.

Carrier plate 20 is provided to be fitted into guide rail 30 on the back side of plate body 20a in the present embodiment, and carrier plate 20 is thus slidable on guide rail 30 in the vertical direction while the movement in the lateral direction is restricted by guide rail 30.

Figure 3:
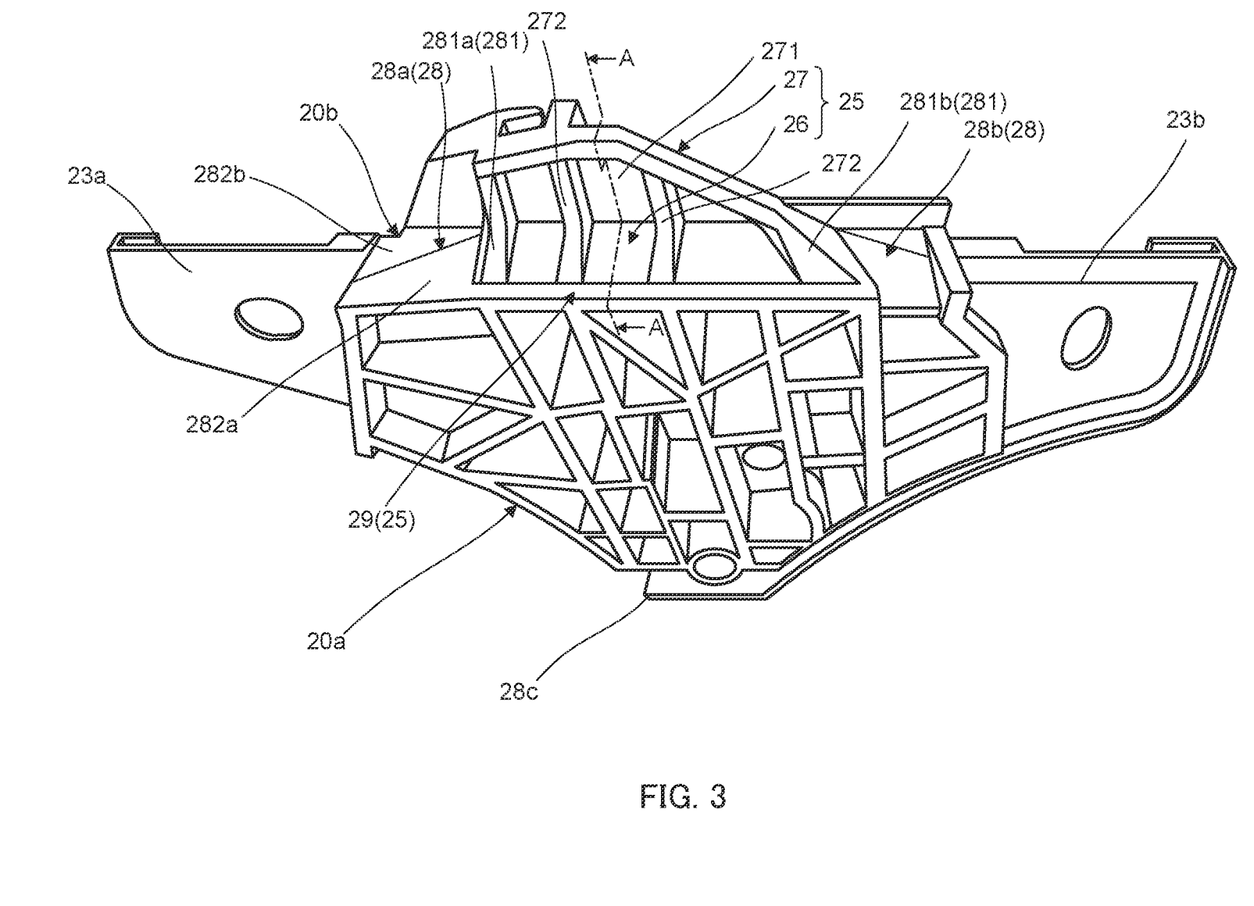
FIG. 3 is a front view of a carrier plate of the opening/closing body opening/closing device according to the embodiment of the present invention.
Figure 4:
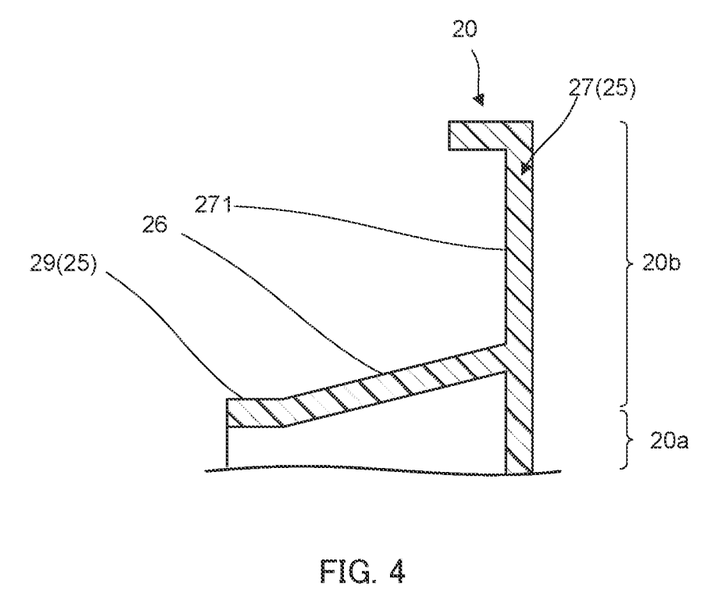
FIG. 4 is a sectional view taken along line A-A of FIG. 3.

FIG. 3 is a front view of carrier plate 20 of opening/closing body opening/closing device 1 according to the embodiment of the present invention, and FIG. 4 is a sectional view taken along line A-A of FIG. 3.

As illustrated in FIGS. 3 and 4, carrier plate 20 includes attaching sections 23a and 23b, water holding section 25, and water discharge section 28. Carrier plate 20 is configured to prevent (avoid water) water (or moisture) reaching upper end portion 20b from flowing out to the guide rail 30 side by water holding section 25 provided at upper end portion 20b. Upper end portion 20b of carrier plate 20 is positioned above the fitting part of end housing sections 21 and 22 and guide rail 30 on plate body 20a. Upper end portion 20b prevents water from above from reaching directly the fitting part of end housing section 21 and 22 and guide rail 30. Incidentally, the shape of plate body 20a can be changed as necessary according to the shapes of guide rail 30 and opening/closing body W, as long as plate body 20a includes water holding section 25 on upper end portion 20b.

Attaching sections 23a and 23b and water holding section 25 are provided on the upper end portion 20b side of plate body 20a. In the present embodiment, water discharge sections 28 are provided on a lower end portion and one side portion of plate body 20a in addition to upper end portion 20b.

Attaching sections 23a and 23b are respectively provided with glass holders 13 that are connected to opening/closing body W. In the present embodiment, attaching sections 23a and 23b each include a wall portion erected extending upward of glass holder 13, and each wall portion is provided with an attaching hole opening in a thickness direction of plate body 20a. Glass holders 13 attached on the lower side of opening/closing body W are rotatably attached via fastening members, such as screws and bolts, inserted into the attaching holes (see FIG. 1).

Attaching sections 23a and 23b are placed on upper end portion 20b so as to be separated by a predetermined distance in a direction intersecting a moving direction. In the present embodiment, attaching sections 23a and 23b are provided in a width direction of guide rail 30. Attaching sections 23a and 23b are respectively placed on one side and the other side in the width direction of guide rail 30 in a state of being slidably engaged with guide rail 30, and are provided on plate body 20a so as to be separated from each other and toward outside of edge portions of guide rail 30 in the width direction. Attaching sections 23a and 23b may be each provided with a plane step portion extending horizontally on the lower side of the erected wall section.

Water holding section 25 is provided at upper end portion 20b of carrier plate 20. Water holding section 25 holds water reaching upper end portion 20b of carrier plate 20 from above carrier plate 20. Water holding section 25 prevents the water from flowing to guide rail 30 by holding the water reaching upper end portion 20b.

The water reaching upper end portion 20b of carrier plate 20 from above may include any water (or moisture) as long as it reaches upper end portion 20b. The water reaching upper end portion 20b is, for example, liquid such as rainwater, and specifically, rainwater that flows down opening/closing body W, rainwater that flows down from opening/closing body W via glass holders 13, or, when a sash is installed, rainwater that flows through the sash, opening/closing body W, and glass holders 13. Note that the liquid need not be rainwater, and may be liquid such as vehicle washing water. Water holding section 25 is provided at a lower position with respect to opening/closing body W. Specifically, water holding section 25 is preferably provided at a position on carrier plate 20 where water adhered to opening/closing body W reaches water holding section 25 directly or via glass holders 13.

In the present embodiment, water holding section 25 is provided on upper end portion 20b, between attaching sections 23a and 23b.

Water holding section 25 is connected to water discharge sections 28 (28a and 28b) via connecting sections 281. Further, water holding section 25 is connected to attaching sections 23a and 23b via water discharge sections 28 (28a and 28b), in the present embodiment.

Water receiving section 26 is provided in a shape to receive water (or moisture) at upper end portion 20b, faces upward, and receives reaching water. Water holding section 25 includes water receiving section 26, outflow preventing section 27, and extension surface 29. Water holding section 25 may have a bottom surface convex toward the lower side, and can accordingly receive more water than a horizontal surface with outflow preventing section 27 and extension surface 29.

Water receiving section 26 is formed to be recessed and opening upward when carrier plate 20 is positioned on the upper end side of guide rail 30 and the opening is closed by opening/closing body W.

Outflow preventing section 27 prevents water from flowing out to the back side of carrier plate 20, that is, the guide rail 30 side. Outflow preventing section 27 includes preventing surface 271 that faces water receiving section 26 side and prevents water (or moisture) from flowing out to guide rail 30.

In the present embodiment, outflow preventing section 27 is erected on the guide rail 30 side of water receiving section 26. Outflow preventing section 27 prevents water received by water receiving section 26 from flowing to the guide rail 30 side at an erected portion of water receiving section 26, that is, a joint portion between outflow preventing section 27 and water receiving section 26.

Preventing surface 271 may be formed in any shape, such as a curved surface, a flat surface, or an uneven surface, as long as it faces water receiving section 26 side and prevents water from flowing out to guide rail 30. In the present embodiment, preventing surface 271 functions as a surface of outflow preventing section 27, and is provided so as to be partitioned into a plurality of portions by a plurality of partition wall sections 272 extending in an erection direction and wall sections serving as connecting sections 281.

Note that, in the present embodiment, water holding section 25 may be configured in any way as long as it has a function of holding water (or moisture) reaching upper end portion 20b of carrier plate 20 from above when carrier plate 20 is positioned on the upper end side of guide rail 30 and the opening is closed by opening/closing body W. Even when carrier plate 20 is positioned at the center or the lower end portion of guide rail 30, for example, water holding section 25 may be configured to hold water reaching upper end portion 20b.

Further, in the present embodiment, water holding section 25 is configured to be partitioned by partition wall sections 272, and has a plurality of recessed portions arranged in the width direction of carrier plate 20, but the configuration of water holding section 25 is not limited to this. On carrier plate 20, outflow preventing section 27 is provided on the guide rail side of water holding section 25. Outflow preventing section 27 is provided as an erected wall section in the present embodiment. Outflow preventing section 27 can easily prevent water from flowing out to the guide rail 30 side when carrier plate 20 moves upward and downward. Water holding section 25 may be configured to include water receiving section 26 that extends in the width direction of carrier plate 20 at upper end portion 20b, and outflow preventing section 27 that extends in the width direction of carrier plate 20 and includes preventing surface 271 facing water receiving section 26. Extension surface 29 may also be placed across the entire width of water receiving section 26.

Extension surface 29 is a surface facing upward. Extension surface 29 inclines upward with respect to the horizontal direction on a side opposite to the guide rail side of water receiving section 26, and extends to a side opposite to guide rail 30.

In the present embodiment, extension surface 29 is provided on a surface serving as the bottom surface of water receiving section 26 on upper end portion 20b, and extends to the side opposite to guide rail 30 from an edge portion on the side opposite to guide rail 30, that is, from an edge portion of the front side of carrier plate 20. Providing extension surface 29 makes it easy for water holding section 25 to hold water.

In the present embodiment, extension surface 29 prevents water (or moisture) received by water receiving section 26 from leaking to the side opposite to the guide rail 30 side, that is, to the front side of carrier plate 20, when carrier plate 20 is positioned at the upper end of guide rail 30. Extension surface 29 is inclined downward as carrier plate 20 moves toward a lower portion of guide rail 30 (see FIG. 5).

Extension surface 29 is provided extending over both sides of upper end portion 20b. When carrier plate 20 is positioned on the upper end side of guide rail 30 and the opening is closed by opening/closing body W, extension surface 29 is placed extending to the side opposite to the guide rail and inclining upward with respect to the bottom surface of water receiving section 26 from a side portion on the front side, which is opposite to the guide rail 30 side, of water receiving section 26.

In the present embodiment, water receiving section 26 formed of a substantially planar flat portion extends over the width direction of carrier plate 20. The edge portion of water receiving section 26 on the guide rail 30 side is provided with outflow preventing section 27. Preventing surface 271 where outflow preventing section 27 faces the water receiving section side forms an angle of substantially 90 degrees or an obtuse angle with water receiving section 26. Extension surface 29 provided on the edge portion of water receiving section 26 on the side opposite to guide rail 30 forms an obtuse angle with the flat portion of water receiving section 26. At the upper end portion of carrier plate 20, water receiving section 26 is placed between preventing surface 271 of outflow preventing section 27 and extension surface 29 in the thickness direction. Preventing surface 271 of outflow preventing section 27 and extension surface 29 restrict movement of water on water receiving section 26 in the thickness direction of carrier plate 20. Water receiving section 26 changes its state between a horizontal state and an inclined state where the guide rail side of water receiving section 26 is an upper side while being lifted and lowered along guide rail 30, but water receiving section 26 can also hold water between itself and outflow preventing section 27, or between itself and extension surface 29. The water held between water receiving section 26 and outflow preventing section 27 or between water receiving section 26 and extension surface 29 can be discharged to a position away from guide rail 30 by water discharge section 28.

Water discharge section 28 includes first water discharge section 28a and second water discharge section 28b that discharge water reaching carrier plate 20 to a lateral side or a lower side of carrier plate 20.

In the present embodiment, first water discharge section 28a and second water discharge section 28b are placed with water holding section 25 in between at upper end portion 20b, and are formed with inclined surfaces. First water discharge section 28a and second water discharge section 28b may be inclined surfaces and may also be vertical surfaces along an extending direction of guide rail 30, and may be provided so as to be connected to the horizontally extending step portions provided on the lower sides of the erected wall sections of attaching sections 23a and 23b. Water discharge section 28 may be provided in a groove shape.

First water discharge section 28a is provided between the attaching section 23a side and the water holding section 25 side at upper end portion 20b. First water discharge section 28a includes a V-shaped groove extending from the back side to the front side of carrier plate 20.

The V-shaped groove is formed of first surface 282a and second surface 282b. When carrier plate 20 is positioned on the upper end side of guide rail 30 and the opening is closed by opening/closing body W, first surface 282a is substantially horizontal and second surface 282b is inclined upward to the back side from first surface 282a. This configuration allows water (or moisture) reaching first water discharge section 28a to be guided to the V-shaped groove and discharged to the front side of carrier plate 20.

Second water discharge section 28b is provided between attaching section 23b side and water holding section 25 side at upper end portion 20b, and is formed with a surface inclined downward to the front side from the back side of carrier plate 20.

This causes second water discharge section 28b to be a substantially horizontal surface or a surface inclined to the front side from the back side of the carrier plate, when carrier plate 20 is positioned on the upper end side of guide rail 30 and the opening is closed by opening/closing body W. This configuration allows water reaching second water discharge section 28b to be discharged to the front side of carrier plate 20 by the inclined surface of second water discharge section 28b.

First water discharge section 28a and second water discharge section 28b include connection sections 281 (281a and 281b) connected to water holding section 25.

Connecting section 281a connects water holding section 25 and first water discharge section 28a so that first water discharge section 28a can discharge water that has reached upper end portion 20b and held by water holding section 25. Connecting section 281b connects water holding section 25 and second water discharge section 28b so that second water discharge section 28b can discharge water that has reached upper end portion 20b and held by water holding section 25. In the present embodiment, each of connecting sections 281a and 281b is an inclined lower portion connected to water receiving section 26, among the wall sections erected from water receiving section 26 and connected to preventing surface 271 of outflow preventing section 27. The inclined lower portion is a portion inclining upward to the back side from the front side in water receiving section 26.

Note that carrier plate 20 is provided with discharge trough 28c over a lower edge portion of plate body 20a and a side edge portion of attaching section 23b.

Discharge trough 28c is provided in a rib shape protruding on the front side of carrier plate 20 on plate body 20a of carrier plate 20. Discharge trough 28 guides water from above to the lower side of carrier plate 20 along an extending direction of discharge trough 28c, and discharges the water without contacting guide rail 30 on the front side of carrier plate 20.

<Water-Avoiding Operation of Carrier Plate 20>

Figure 5:
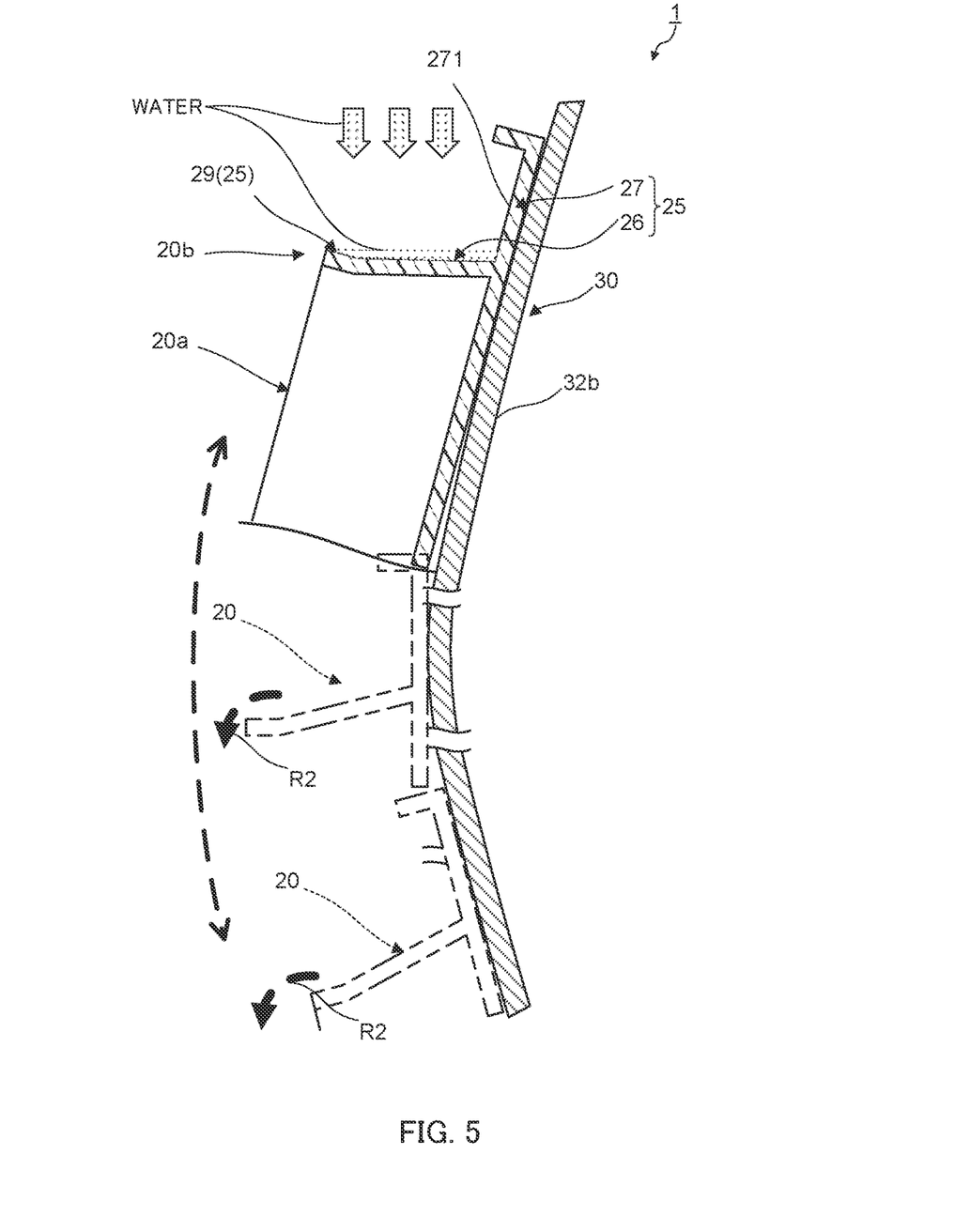
FIG. 5 is a partial sectional view schematically illustrating a water-avoiding operation of the carrier plate.

FIG. 5 is a partial sectional view schematically illustrating a water-avoiding operation of the carrier plate.

As illustrated in FIG. 5, carrier plate 20 is positioned at the upper end side of guide rail 30 in opening/closing body opening/closing device 1. The bottom surface of water receiving section 26 of carrier plate 20 is formed horizontally when the opening is closed by opening/closing body W, and water receiving section 26 forms a recessed shape opening upward with outflow preventing section 27 and extension surface 29. This configuration allows water (or moisture) reaching upper end portion 20b from above carrier plate 20 to reach water receiving section 26 at upper end portion 20b of carrier plate 20. Water receiving section 26 can receive water reaching upper end portion 20b from above, and outflow preventing section 27 can prevent the water from flowing to the back side of carrier plate 20.

Figure 6:
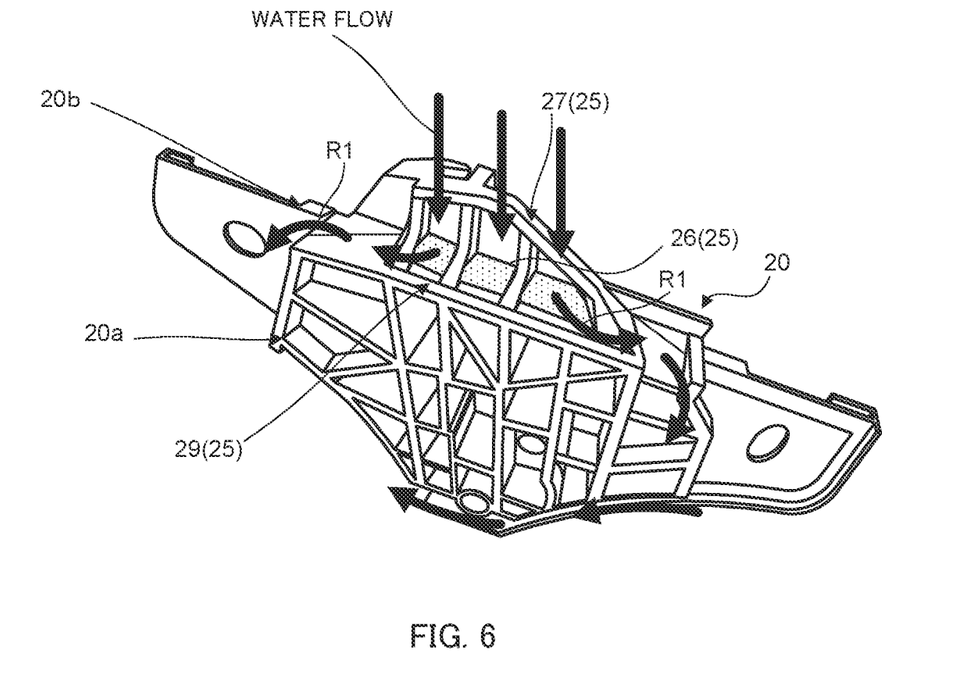
FIG. 6 is a diagram illustrating general flow of water in a case of exceeding an allowable amount of water collected in a water holding section.

When more water reaches upper end portion 20b from above, the water amount exceeds an allowable amount of water receiving section 26. In this case, as illustrated in FIG. 6, when the water amount exceeds the allowable amount of water receiving section 26, the water exceeding the allowable amount flows to connecting sections 281a and 281b (arrow R1), and is discharged outside carrier plate 20 by guidance of water discharge sections 28 (28a and 28b) connected to water holding section 25.

This prevents water from flowing to the guide rail 30 side, and thus no water flows to cables 60, drive section 70, and drum member 80.

As described above, according to opening/closing body opening/closing device 1 of the present embodiment, carrier plate 20 can hold water such as water droplets that has reached upper end portion 20b, with water receiving section 26 and outflow preventing section 27 of water holding section 25, thereby preventing the water from flowing toward the guide rail side.

For carrier plate 20 positioned at the upper end of the guide rail, the upper surface (the bottom surface of water receiving section 26) is provided to have an angle with the horizontal surface at upper end portion 20b. Thus, the water can be collected in a corner between water receiving section 26 and outflow preventing section 27 erected from water receiving section 26. Further, when a predetermined amount or more water is collected between water receiving section 26 and outflow preventing section 27, the water is flowed to water discharge sections 28a and 28b via connecting sections 281a and 281b, and can be flowed to the lateral side (see arrow R1) or the front side of carrier plate 20 without flowing out to the guide rail 30 side. That is, the water is flowed in a direction away from the guide rail side, which is the back side of carrier plate 20, thereby preventing the water from flowing to guide rail 30 and adhering to guide rail 30.

Furthermore, when carrier plate 20 moves downward from the position on the upper end side of guide rail 30, carrier plate 20 moves so that upper end portion 20b inclines downward according to the curved shape of guide rail 30, as indicated by carrier plate 20 in broken lines in FIG. 5. This causes water receiving section 26 of water holding section 25 at upper end portion 20b to be a surface inclined to the front side, and the collected water flows to the front side (see arrow R2 of FIG. 5) or the lateral side of carrier plate 20. Thus, no water flows to the guide rail 30 side.

As described above, the present embodiment makes it possible to effectively prevent water (or moisture) such as rainwater flowing down from opening/closing body W carried by carrier plate 20 from adhering to guide rail 30 that guides movement of carrier plate 20. This prevents rust on guide rail 30, and further prevents water from adhering to drive section 70 provided to guide rail 30, and cables 60 connected to carrier plate 20, for example.

Further, it is possible to move carrier plate 20 to the lower end position of guide rail 30 and open the opening/closing body without water flowing to the guide rail 30 side and adhering to guide rail 30.

In addition, the details specifically described in the embodiments can be changed as appropriate without departing from the gist of the invention.

INDUSTRIAL APPLICABILITY

The present invention is applicable to window regulators that lift and lower window glasses of vehicles such as cars.

REFERENCE SIGNS LIST

1 Opening/closing body opening/closing device
13 Glass holder
20 Carrier plate
20a Plate body
20b Upper end portion
21, 22 End housing section
23a, 23b Attaching section
25 Water holding section
26 Water receiving section
27 Outflow preventing section
28 Water discharge section
28a First water discharge section (water discharge section)
28b Second water discharge section (water discharge section)
28c Discharge trough
29 Extension surface
30 Guide rail
32 Guide section body
32a Front surface
32b Back surface
32c Guide section
40 Direction-changing section
41 Upper joint member
41a Fastening section
60 Cable
61 Lifting cable
62 Lowering cable
70 Drive section
80 Drum member
82 Drum housing
271 Preventing surface
272 Partition wall section
281 Connecting section
281a, 281b Connecting section
282a First surface
282b Second surface
612, 622 Terminal member

What is claimed is:
1. An opening and closing body opening and closing device, comprising:
a carrier plate that carries an opening and closing body; and
a guide rail that has a curved shape and guides movement of the carrier plate in a lifting and lowering direction of the opening and closing body, wherein:
the carrier plate comprises, at an upper end portion of the carrier plate, a water holding section that holds water reaching the upper end portion from above the carrier plate, and
the water holding section comprises:
 a water receiving section that faces upward and receives a reaching water,
 an outflow preventing section provided with a preventing surface that faces a side of the water receiving section and prevents the water from flowing out to the guide rail, and
 on a side opposite to the side of the guide rail in the water receiving section, an extension surface that extends to a side opposite to the guide rail and inclines upward with respect to the water receiving section, and when the carrier plate moves downward from a position on an upper end side of the guide rail, the carrier plate moves so that the extension surface inclines downward, and the water receiving section is placed between the preventing surface of the outflow preventing section and the extension surface in a thickness direction of the carrier plate.

2. The opening and closing body opening and closing device according to claim 1, wherein:

the carrier plate further comprises a water discharge section that discharges the water to a lateral side or a lower side of the carrier plate, and the water discharge section comprises a connecting section that is connected to the water holding section such that the water in the water holding section is dischargeable.

3. The opening and closing body opening and closing device according to claim 1, wherein the outflow preventing section is erected on a side of the guide rail in the water receiving section.

* * * * *